United States Patent
Ma et al.

(10) Patent No.: US 10,929,318 B2
(45) Date of Patent: Feb. 23, 2021

(54) MEMORY CONTROLLER ENABLING DUAL-MODE ACCESS TO MEMORY MODULE

(71) Applicant: MONTAGE TECHNOLOGY CO., LTD., Shanghai (CN)

(72) Inventors: Qingjiang Ma, Shanghai (CN); Gang Shan, Shanghai (CN); Chunyi Li, Shanghai (CN)

(73) Assignee: MONTAGE TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 16/721,932

(22) Filed: Dec. 20, 2019

(65) Prior Publication Data

US 2020/0293467 A1    Sep. 17, 2020

(30) Foreign Application Priority Data

Mar. 11, 2019 (CN) .......................... 201910181860.2

(51) Int. Cl.
  *G06F 13/16*   (2006.01)
  *G06F 13/42*   (2006.01)
  *G06F 12/14*   (2006.01)

(52) U.S. Cl.
  CPC ...... *G06F 13/1673* (2013.01); *G06F 12/1416* (2013.01); *G06F 13/4291* (2013.01)

(58) Field of Classification Search
  CPC .. G06F 12/1416; G06F 13/4291; G06F 13/14; G06F 13/1668; G06F 13/1673
  See application file for complete search history.

(56) References Cited

U.S. PATENT DOCUMENTS

| | | | | |
|---|---|---|---|---|
| 10,769,082 | B2 * | 9/2020 | Patel | G06F 3/0673 |
| 2017/0220294 | A1 * | 8/2017 | Park | G06F 3/0647 |
| 2017/0344051 | A1 * | 11/2017 | Patel | G06F 1/10 |
| 2018/0032445 | A1 * | 2/2018 | Lee | G06F 3/0659 |
| 2018/0225235 | A1 * | 8/2018 | Lee | G06F 11/1048 |
| 2018/0285013 | A1 * | 10/2018 | Rajan | G06F 3/0613 |
| 2019/0129879 | A1 * | 5/2019 | Gonzalez | G06F 13/4243 |

* cited by examiner

*Primary Examiner* — Raymond N Phan
(74) *Attorney, Agent, or Firm* — Jun He Law Offices P.C.; James J. Zhu (57) ABSTRACT

The application discloses a memory controller coupled to a memory module for controlling access to the memory module, wherein the memory module comprises one or more memory groups each having a plurality of memory blocks, and the memory controller comprising: a registering clock driver coupled to the memory module for providing to the memory module a data access command so as to control access to the memory module; one or more data buffers coupled to the registering clock driver, and each data buffer coupled to a memory group via a memory group data interface; wherein at least one of the memory group data interfaces comprises a plurality of data buses each coupled to one or more memory blocks of the memory group that the memory group data interface coupled to, such that the memory group can exchange data with the data buffer via the plurality of data buses under the control of the registering clock driver.

9 Claims, 10 Drawing Sheets

MEMORY CONTROLLER ENABLING DUAL-MODE ACCESS TO MEMORY MODULE

FIELD OF THE INVENTION

The disclosure generally relates to memory technology, and more particularly, to a memory controller.

BACKGROUND

In current computer systems, a memory module usually comprises a memory buffer chip which, as a necessary path for a central processing unit (CPU) to access memory data, is used for improving the speed and stability of the memory data access so as to match the increasing CPU operating speed and performance. A conventional memory buffer chip includes: a registering clock driver (RCD) that can be used to store and buffer address, command and control signals from the CPU, and a data buffer (DB) that can be used to store and buffer data signals from memory blocks or from the CPU which acts as a memory controller.

However, in intensive computing application, a bandwidth of an interface between the CPU and the memory module is still unable to meet the requirement of such application. Therefore, it is necessary to provide an improved memory system.

SUMMARY

An objective of the present application is to provide a memory controller to meet the bandwidth requirement of a memory module for high data throughput applications.

In some aspects of the present application, a memory controller coupled to a memory module for controlling access to the memory module is provided, wherein the memory module comprises one or more memory groups each having a plurality of memory blocks, and the memory controller comprising: a registering clock driver coupled to the memory module for providing to the memory module the data access command so as to control access to the memory module; one or more data buffers coupled to the registering clock driver, and each data buffer coupled to a memory group via a memory group data interface; wherein at least one of the memory group data interfaces comprises a plurality of data buses each coupled to one or more memory blocks of the memory group that the memory group data interface coupled to, such that the memory group can exchange data with the data buffer via the plurality of data buses under the control of the registering clock driver.

In some embodiments, the registering clock driver comprises a configuration unit, and the registering clock driver and the data buffer operate in a first mode or a second mode based on a state of the configuration unit, wherein: in the first mode, the registering clock driver receives the data access command from a host controller and is responsive to the data access command to allow access to the memory module by the host controller via the data buffer; and in the second mode, the registering clock driver generates the data access command to instruct the data buffer to access the memory module according to the data access command.

In some embodiments, the registering clock driver is configured to receive state control information from the host controller via a command/address bus and to configure the state of the configuration unit according to the state control information.

In some embodiments, the registering clock driver is coupled to the host controller via a SMBus interface, and the host controller is configured to change or read the state of the configuration unit in the registering clock driver via the SMBus interface.

In some embodiments, the data buffer is coupled to the registering clock driver and is configured to receive an operation command from the registering clock driver, and the operation command is for instructing the data buffer to operate in the first mode or in the second mode.

In some embodiments, the data buffer comprises a logic control unit, a multiplexing unit and a first computing unit, and wherein the logic control unit is configured to receive the operation command from the registering clock driver, wherein the logic control unit is configured to control the multiplexing unit to exchange data between the one or more memory blocks and the host controller when the operation command indicates that the registering clock driver and the data buffer are operating in the first mode; and the logic control unit is configured to control the multiplexing unit to exchange data between the one or more memory blocks and the first computing unit when the operation command indicates that the registering clock driver and the data buffer are operating in the second mode.

In some embodiments the registering clock driver comprises a second computing unit coupled to the multiplexing unit of each data buffer, and the logic control unit is further configured to control the multiplexing unit to exchange data between the one or more memory blocks and the second computing unit when the operation command indicates that the registering clock driver and the data buffer are operating in the second mode.

In some embodiments, the data buffer comprises a logic control unit, a multiplexing unit, the registering clock driver comprises a computing unit, and the computing unit is coupled to the multiplexing unit of each data buffer, wherein the logic control unit is configured to receive the operation command from the registering clock driver, and wherein the logic control unit is configured to control the multiplexing unit to exchange data between the one or more memory blocks and the host controller when the operation command indicates that the registering clock driver and the data buffer are operating in the first mode; and the logic control unit is configured to control the multiplexing unit to exchange data between the one or more memory blocks and the computing unit when the operation command indicates that the registering clock driver and the data buffer are operating in the second mode.

In other aspects of the present application, a memory system comprising a memory module and a memory controller coupled to the memory module for controlling access to the memory module is provided, wherein the memory module comprises one or more memory groups each having a plurality of memory blocks, and wherein the memory controller comprises: a registering clock driver coupled to the memory module for providing to the memory module a data access command so as to control access to the memory module; and one or more data buffers coupled to the registering clock driver, and each data buffer coupled to a memory group via a memory group data interface, wherein at least one of the memory group data interfaces comprises a plurality of data buses each coupled to one or more memory blocks of the memory group that the memory group data interface is coupled to, such that the memory group can exchange data with the data buffer via the plurality of data buses under the control of the registering clock driver.

In other aspects of the present application, a computer system comprising the above aspects of the memory system is provided.

The foregoing is the summary of the present application, which may be simplified, summarized, and details omitted. Therefore, a person skilled in the art should recognize that this part is merely an illustrative example and is not intended to limit the scope of the application in any way. This summary is neither intended to identify the key or required characteristics of the subject matter claimed to be protected nor is it intended to be an adjunct to determining the scope of the subject matter claimed to be protected.

BRIEF DESCRIPTION OF THE DRAWINGS

The foregoing and other features of the present application will be more fully understood from the following description and the appended claims taken in conjunction with the accompanying drawings. It is to be understood that these accompanying drawings merely illustrate certain embodiments in accordance with the present disclosure and should not be considered as limiting the scope of the present application. The present disclosure will be illustrated more clearly and in more detail with the accompanying drawings.

DETAILED DESCRIPTION OF THE DRAWINGS

The following detailed description refers to the accompanying drawings as a part of the present disclosure. In the figures, similar symbols generally represent similar components unless otherwise stated in the context. The illustrative embodiments described in the detailed description, the accompanying drawings and the claims are not limiting. Other embodiments may be adopted, or modifications may be made without deviation from the spirit and the subject of the disclosure. It can be understood that, the various aspects of the disclosure described and graphically presented herein may be arranged, replaced, combined, divided and designed in many different configurations, and these different configurations are implicitly included in the disclosure.

Figure 1:
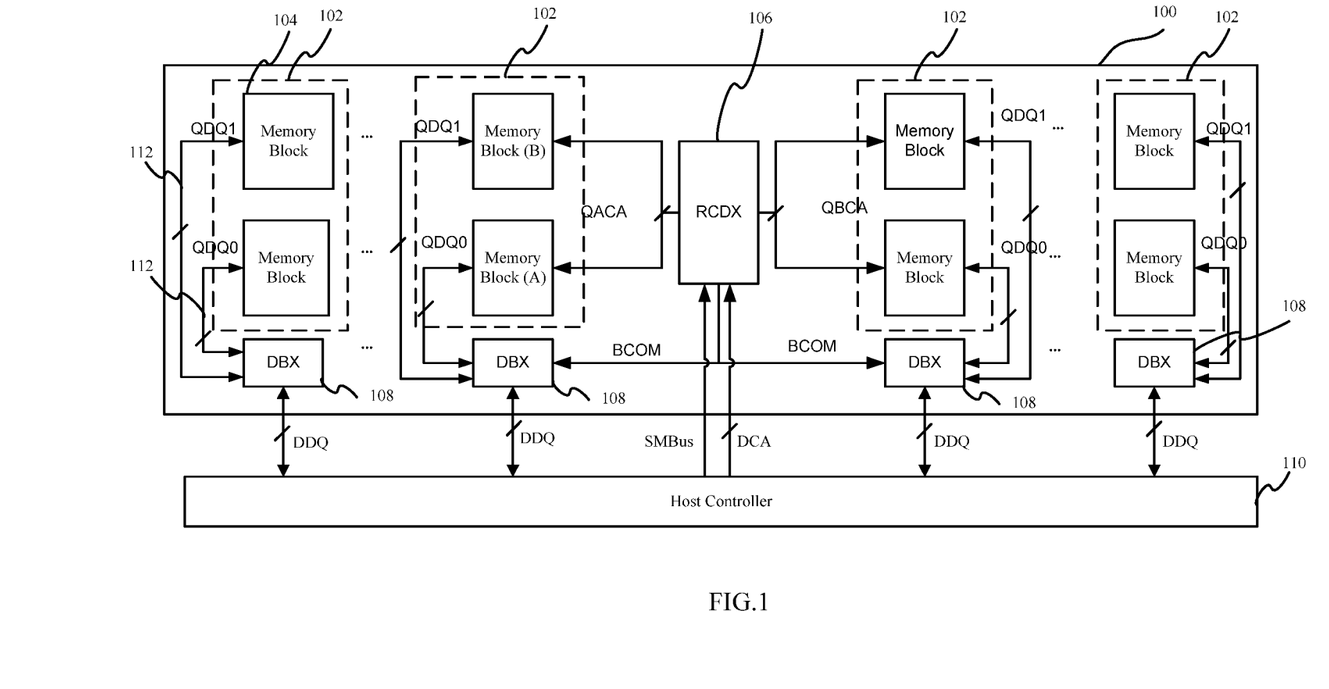
FIG. 1 illustrates a memory system according to an embodiment of the present application.

FIG. 1 illustrates a memory system 100 according to an embodiment of the present application.

As illustrated in FIG. 1, the memory system 100 comprises a memory module, wherein the memory module comprises a plurality of memory groups 102 each having two memory blocks 104 for storing data. In some embodiments, the memory module may be a memory module in accordance with the JEDEC Double Data Rate (DDR) Synchronous Dynamic Random Access Memory (SDRAM) standards including, for example, the JEDEC DDR1, DDR2, DDR3, DDR4, DDR5 and other DDR standards. Moreover, the memory module may also be an internal memory module in accordance with other standards or protocols (e.g. the SDRAM or RAMBUS internal memory standard) and may also be a memory module in accordance with future memory standards or protocols. In some embodiments, the memory module may include a volatile memory (e.g., DRAM), a non-volatile memory (e.g., flash memory, such as NAND or NOR flash memory) or a combination thereof. In other embodiments, the memory module may also be a new type of memory module manufactured through other manufacturing processes, including but not limited to: magneto-resistive memory, phase change memory, resistive memory, semi-floating gate memory, or any other type of memories. It should be noted that the memory system in FIG. 1 is merely an example. In other embodiments, the memory module may comprise only one memory group or each memory group may comprise more than two memory blocks, and the number of memory blocks in each memory group may be the same or different from each other. Moreover, it should be noted that the memory block described herein may be a memory die, or may include two or more memory dies.

As illustrated in FIG. 1, the memory system 100 comprises a memory controller which comprises a registering clock driver (RCDX) 106 and a plurality of data buffers (DBX) 108.

Specifically, the registering clock driver 106 is coupled between a host controller 110 (e.g., CPU) and the memory module, and can receive data access commands including access addresses and access types from the host controller 110. For example, the data access command may be a command to access (e.g., read or write) one or more data memory addresses (i.e., access addresses) of the memory module. In some embodiments, the registering clock driver 106 is coupled to the host controller 110 through a command/address (C/A) bus to receive the data access command. For the memory system in accordance with the DDR4 standard, the C/A bus may include pins A0-A17, pins BG0-BG1 and/or pins BA0-BA1. The pins BG0-BG1 are used to determine which memory group in the memory module is to be accessed, e.g. being written into or being read from; the pins BA0-BA1 are used to determine which memory group in the memory module is to be accessed; and the pins A0-A17 are used for addressing and determining which memory block in the memory group is to be accessed. Moreover, inputs to the pins A16 (RAS_n), A15 (CAS_n), A14 (WE_n) and ACT_n are used for determining the input data access command such as read command, write command or other predefined control commands. In the embodiment of the present disclosure, in some cases, chip selecting signals corresponding to the plurality of memory blocks included in the same memory group may be simultaneously set as active, such that these memory blocks can exchange data with the data buffers through their respective data buses. After receiving a data access command from the host controller 110, the registering clock driver 106 provides the data access command to the memory groups 102 or the memory blocks 104 after corresponding processing and analysis. In addition, the registering clock driver 106 also processes the data access command to generate an operation command, such as a read command or a write command, etc., and provides the operation command to the data buffers 108. For example, as illustrated in FIG. 1, the operation command can be transmitted through a data buffer control bus (BCOM) between the registering clock driver 106 and the data buffers 108.

As illustrated in FIG. 1, the plurality of data buffers 108 are coupled to the registering clock driver 106 respectively and each data buffer 108 is coupled to a corresponding memory group 102 through a memory group data interface. In addition, each data buffer 108 is coupled to the host controller 110 for exchanging data with the host controller 110. The memory group data interface comprises a plurality of data buses 112, such that the memory blocks in the corresponding memory group can exchange data with the data buffers 108 respectively through the plurality of data buses 112 under the control of the registering clock driver 106. In some embodiments, the number of data buses 112 in each memory group data interface is equal to the number of memory blocks 104 in the corresponding memory group 102, such that each memory block 104 can exchange data with the data buffer 108 via its respective data bus 112. For example, the memory block (A) and the memory block (B) in FIG. 1 are coupled to the corresponding data buffers 108 via data buses QDQ0 and QDQ1 respectively. It can be understood that, when each memory block exchanges data with the data buffer via the corresponding data bus, the registering clock driver can provide a valid chip selecting signal to each memory block, such that these memory blocks can be enabled to exchange data. In other embodiments, the number of data buses 112 in each memory group data interface may be less than the number of memory blocks 104 in the corresponding memory group 102, such that some data buses in these memory group data interfaces are each coupled to one memory block in the corresponding memory group for data exchange, while the other data buses in these memory group data interfaces are each coupled to a plurality of memory blocks in the corresponding memory group. For example, a memory group comprises 4 memory blocks MC0-MC3, while the memory group data interface that the memory group is coupled to comprises 2 data buses DB0 and DB1. Then the memory block MC0 can be coupled to the data bus DB0, while the other memory blocks MC1-MC3 can be coupled to the other data bus DB1; or the memory blocks MC0 and MC1 can be coupled to the data bus DB0, while the memory blocks MC2 and MC3 can be coupled to the data bus DB1. It should be noted that the memory system in FIG. 1 is merely an example. In other embodiments, the memory controller may comprise only one data buffer which is correspondingly coupled to one memory group. In other embodiments, each memory group data interface may comprise only one data bus which is coupled to each memory block in the corresponding memory group.

The registering clock driver 106 and the data buffers 108 in FIG. 1 are further described below with reference to FIG. 2 and FIG. 3.

Figure 2:
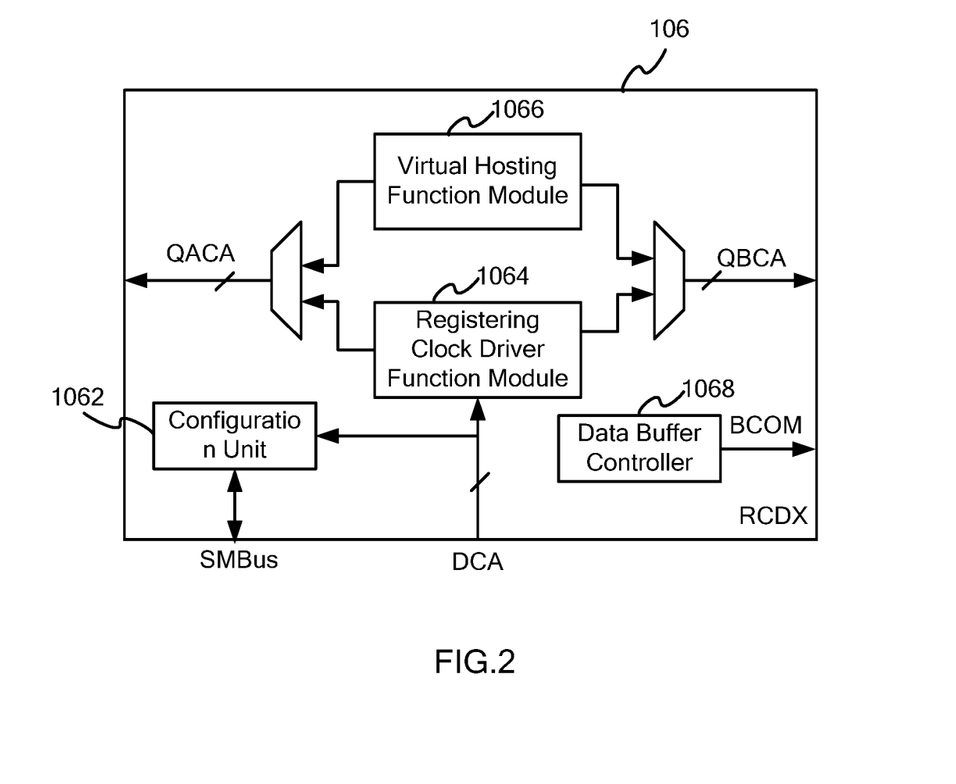
FIG. 2 illustrates an exemplary structure of the registering clock driver in the memory system of FIG. 1

As illustrated in FIG. 2, the registering clock driver 106 comprises a configuration unit 1062. The registering clock driver 106 and the data buffers 108 can operate in two different modes based on the state of the configuration unit 1062, that is, operating in a first mode (in some embodiments also referred to as the normal system memory mode) or in a second mode (in some embodiments also referred to as the intensive computing mode). Specifically, a registering clock driver function module 1064 and a virtual hosting function module 1066 can be configured in the registering clock driver 106. Depending on the specific embodiments, the registering clock driver function module 1064 may or may not have data/signal processing capability. For example, the registering clock driver function module 1064 may only be responsible for forwarding commands received from the DCA bus to the QCA bus (QACA and QBCA buses shown in FIG. 2). In the first mode, the registering clock driver function module 1064 is enabled, and the registering clock driver 106 mainly controls the access of the host controller to the memory module through the registering clock driver function module 1064, which is generally compatible with the standard and the operation mode of the existing registering clock driver standard (i.e., the DDR4 or DDR5 standard); in the second mode, the virtual hosting function module 1066 is enabled, and the registering clock driver 106 can individually control the access to the memory module without relying on the host controller. In some embodiments, the registering clock driver function module 1064 and the virtual hosting function module 1066 can be implemented by software, hardware, firmware, or a combination thereof, respectively. For example, the registering clock driver function module 1064 and the virtual hosting function module 1066 can be application-specific integrated circuits or field programmable gate array chips. The registering clock driver 106 further comprises a data buffer controller 1068 for transmitting the operation commands to the data buffers 108 via the BCOM bus. When the registering clock driver 106 operates in the first mode, the registering clock driver function module 1064 receives a data access command from the host controller 110 and provides the data access command to the memory module, and generates an operation command according to the received data access command and provides the operation command to the data buffers 108 through the data buffer controller 1068 and the BCOM bus, and then exchanges data with the memory module via the data buffers 108. When the registering clock driver 106 operates in the second mode, the virtual hosting function module 1066 generates a data access command and provides the date access command to the memory module, and generates an operation command and provides the operation command to the data buffers 108 through the data buffer controller 1068 and the BCOM bus. The operation command also indicates whether the registering clock driver 106 is operating in the first mode or the second mode, such that the data buffers 108 can enter the corresponding operation mode to perform corresponding operations.

In some embodiments, the configuration unit 1062 may be a register, and the state of the configuration unit 1062 can be changed or configured by changing the value or data of the register. In some embodiments, the data access command which is received by the registering clock driver 106 from the host controller 110 via the command/address bus further comprises state control information, or the registering clock driver 106 receives the state control information from the host controller 110 through other interface(s), such that the registering clock driver 106 can change the state of the configuration unit 1062 according to the received state control information. The state control information can be configured through the control commands which are used for configuring the value or state of each register (including the configuration unit 1062) in the registering clock driver 106. For example, in the embodiment in accordance with the DDR4 protocol, the state control information received by the registering clock driver 106 from the host controller is included in a WRC command, therefore the state of the configuration unit 1062 can be configured through parameters included in the WRC command. For another example, in the embodiments in accordance with the DDR5 protocol, the host controller can configure the state of the configuration unit 1062 through a MRW command. In other embodiments, the registering clock driver 106 can also automatically change or configure the state of the configuration unit 1062 according to its own operation requirements. In other embodiments, the configuration unit 1062 can also be coupled to the host controller 110 via a SMBus interface, such that the host controller 110 can change or read the state of the configuration unit via the SMBus interface.

Figure 3:
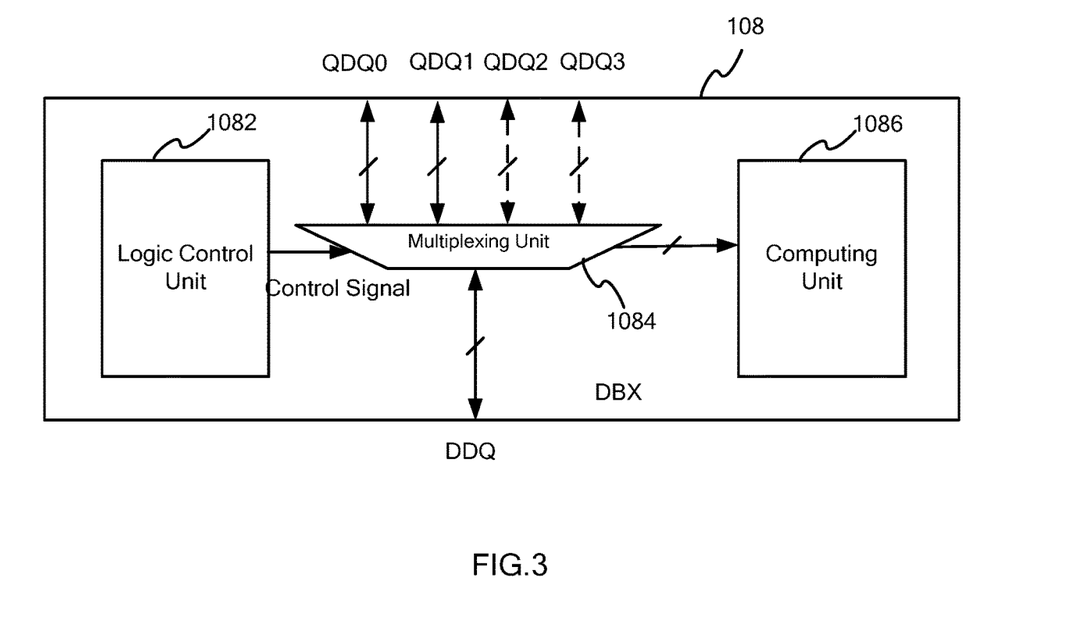
FIG. 3 illustrates an exemplary structure of the data buffer in the memory system of FIG. 1

As shown in FIG. 3, each data buffer 108 comprises a logic control unit 1082, a multiplexing unit 1084 and a computing unit 1086. In some embodiments, the multiplexing unit 1084 can be a multiplexer/demultiplexer (MUX/DeMUX) circuit, and the computing unit 1086 can be a neural network processor or other processing modules having computing capability. For example, the computing unit 1086 can be used for encryption/decryption or encoding/decoding computation. In other embodiments, the computing unit 1086 can perform any needed computing or data processing operation. The logic control unit 1082 receives operation commands from the data buffer controller 1068 of the registering clock driver 106. When the operation command indicates that the registering clock driver 106 is operating in the first mode, the logic control unit 1082 controls the multiplexing unit 1084 to perform data exchange between the memory blocks and the host controller 110, which is determined according to the data access command. For example, the data access command instructs to read the memory block (B) as shown in FIG. 1, and the memory block (B) is coupled to the data buffer 108 via the data bus QDQ1; then the control unit 1082 generates a corresponding control signal and provides the control signal to the multiplexing unit 1084; the data read from the memory block (B) is transmitted to the host controller 110 via the data bus DDQ through the multiplexing unit 1084. The processing of the write operation is similar, thus will not be repeated herein.

When the operation command indicates that the registering clock driver 106 is operating in the second mode, the logic control unit 1082 controls the multiplexing unit 1084 to perform data exchange between the memory blocks and the computing unit 1086, which is determined according to the data access command. For example, the data access command instructs to perform a shift operation on the memory block (A) and the memory block (B) in FIG. 1, and the memory block (A) and the memory block (B) are coupled to the data buffer 108 via the data bus QDQ0 and QDQ1 respectively; then the logic control unit 1082 generates a corresponding control signal and provide the control signal to the multiplexing unit 1084, and the data read from the memory block (A) and the memory block (B) is transmitted to the computing unit 1086 under the control of the multiplexing unit 1084. After the shift operation is performed, the aforementioned data is transmitted back to the memory block (A) and the memory block (B) via the data buses QDQ0 and QDQ1, respectively. It can be seen that since the memory block (A) and the memory block (B) in FIG. 1 are coupled to the data buffer 108 through the data buses QDQ0 and QDQ1 respectively, the data can be transmitted through the two data buses QDQ0 and QDQ1 simultaneously. The bandwidth between the memory module and the data buffers 108 is doubled compared with the existing solution that two memory blocks share a single data bus. Similarly, if a memory group comprises four memory blocks and these four memory blocks are connected to the data buffer 108 via four data buses (e.g., data buses QDQ0, QDQ1, QDQ2 and QDQ3 in FIG. 3) respectively, the bandwidth between the memory module and the data buffer 108 is increased by four times compared with the solution that four memory blocks share one data bus. In some embodiments, during a single operation, the data buffer 108 can write data to the corresponding memory group through a part of the data buses (e.g., QDQ0 and QDQ1) and simultaneously read data from the corresponding memory groups through the other part of the data buses (e.g., QDQ2 and QDQ3). This operation mode can effectively reduce the overall read and write time.

In the memory system of the present disclosure, the registering clock driver and the data buffers can operate in two modes. In one of the two modes, the memory system operates as a normal system memory: if a write/read command is received from the host controller, the registering clock driver function module of the registering clock driver is enabled and the data buffers merely determine which memory block is a target of the write/read command according to the data access command to implement data exchange between the memory block and the host controller. While in the other mode (also known as the intensive computing mode), the computing function is integrated into the memory system and thus can be used for intensive computing directly. At this time, the virtual hosting function module of the registering clock driver is enabled and the registering clock driver simultaneously sends computing commands to a plurality of memory groups or a plurality of memory blocks which transmit the data stored therein to the computing units of the corresponding data buffers to perform intensive computation according to the computing commands, therefore the bandwidth can be increased. In addition, compared with the computation performed by the host controller, this intensive computing operation mode offloads the intensive computation to the memory system and does not require frequent data transfer between the host controller and the memory module, which is beneficial for the improvement of the computing power of the system.

It should be noted that in the embodiment shown in FIG. 1, the memory blocks of each memory group 102 are coupled to the corresponding data buffers via respective data buses. In some alternative embodiments, the memory blocks in each memory group may be coupled to the corresponding data buffers through a shared data bus. In this case, the registering clock driver can control, through the chip selecting signal, which memory block in the memory group to perform the data exchange with the data buffer via the data bus, and then the exchanged data is provided to the registering clock driver for computing, and/or the computing result is provided to the data buffer by the registering clock driver.

Figure 4:
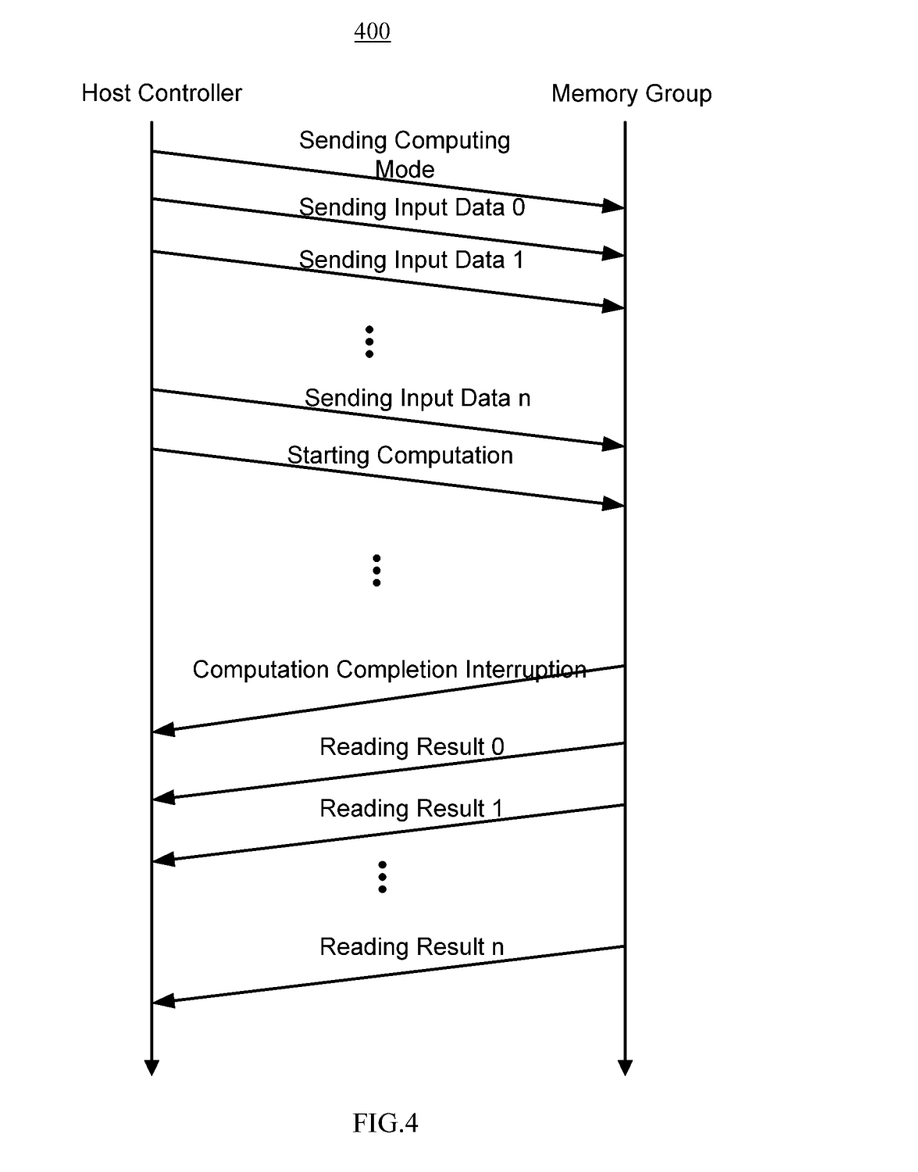
FIG. 4 illustrates a flow chart of an intensive computing method according to an embodiment of the present application.

FIG. 4 illustrates a flow chart of an intensive computing method 400 according to an embodiment of the present application. The method is applied to the host controller and the memory system (e.g., the memory system 100 in the above embodiment), and is implemented by a computer system including the host controller and the memory system. Before the intensive computing starts, the host controller and the memory system can operate in the normal system memory mode.

When the host controller determines that intensive computing is to be performed, the host controller sends to the memory system an instruction of the computing mode (S402), which indicates the type of computation to be performed by the memory system, e.g., multiplication, convolution, or other algorithms used in intensive computing application like artificial intelligence, encryption/decryption and video encoding/decoding. It can be understood that the specific content of the computing mode can be adjusted and designed according to practical needs of the applications.

Then, the host controller sends the input data to be computed to the memory system (S404), for example, the data can be input data 0 to input data n shown in FIG. 4. In some embodiments, the host controller can write the input data to the memory module through data buffers of the memory system. The specific write control can be controlled by the registering clock driver in response to the command of the host controller. In some embodiments, the data sent by the host controller is scrambled and protected by ECC, and the memory system needs to perform a data descrambling and an ECC decoding through its internal logic module.

Then, the host controller sends an instruction of starting computation to the memory system (S406). For example, in the embodiment in accordance with the DDR4 protocol, the host controller can send a command of starting computation to the memory system through the WRC command. For another example, in the embodiment in accordance with the DDR5 protocol, the host controller may send a command of starting computation to the memory system through the MRW command. In some embodiments, the host controller changes the state of the configuration unit in the registering clock driver via the data access command provided by the command/address bus or via the SMBus interface, and notifies the registering clock driver to switch to the intensive computing mode, and the registering clock driver sends the notification to the data buffer via the BCOM bus. Then, the data buffer further switches its operation mode to the intensive computing mode. After the registering clock driver switches to the intensive computing mode, the virtual hosting function module within the registering clock driver enables the intensive computing function, generates a data access command and provides it to the memory module, and generates an operation command and provides it to the data buffer via the data buffer controller. The operation command indicates the type of computation to be performed and indicates which memory addresses of the memory module need to be accessed for data read or write operation.

Then, the data buffer obtains data from the memory module according to the data access command and provides the data to the computing unit under the control of the logic control unit; the computing unit performs corresponding computations on the data according to the operation command. After the computation is completed, the data buffer writes the computing result back to the memory module. Then the memory system sends the host controller a computation completion interrupt (S408) that notifies the host controller that the intensive computation is completed. In some embodiments, the memory system may use an alert n signal line to send the computation completion interrupt to the host controller. The alert n signal line is a signal line between the registering clock driver and the host controller and can be used to notify the host controller when a command/data verification error occurs in the memory module. By multiplexing the alert n signal line, the function of sending computation completion interrupt to the host controller can be accomplished. It can be understood that in different embodiments, the memory system can also use other signal line coupled between the host controller and the registering clock driver to return computation completion information.

According to other embodiments, the memory address of the read data in the memory module may be the same as or different from the memory address of the written data in the memory module.

Finally, the host controller reads the computing result from the memory module after receiving the computation completion interrupt (S410).

In the method 400 above, after the intensive computation is completed, the memory system sends a computation completion interrupt to the host controller to notify the host controller that the computation is completed. However, in other embodiments, the memory system may utilize a passive notification method. For example, after the intensive computation is completed, the registering clock driver in the memory controller switches to the normal system memory mode and notifies the data buffer to switch back to the normal system memory mode via the BCOM. Meanwhile, the registering clock driver also changes the state of its configuration unit to indicate the completion of intensive computation. The host controller may read the state of the configuration unit in the registering clock driver via the SMBus interface, and once the host controller finds that the intensive computation is completed, it reads the computing result from the memory module. In other embodiments, after the intensive computation is completed, the memory system may also instruct to store the state information indicating the completion of the intensive computation to the data buffer or the memory module, and then the host controller reads the state information.

It should be noted that during the intensive computing process, the host controller cannot access the memory group participating in the intensive computation, which may avoid unnecessary interrupts to the intensive computing process by the host controller. Alternatively, the host controller can provide additional commands to indicate the interruption of the computation in consideration of potential system requirements. In this case, the registering clock driver or data buffer can send feedback information indicating that the computation is not completed after the interruption of the computation. In some embodiments, in a memory system with a plurality of memory groups, although the host controller is unable to access the memory group that is participating in the intensive computation, it can still access other memory groups that operate in the normal system memory mode. For example, the data buffer may provide the RTT function, which enables the host controller to access other memory groups in the same channel that operate in the normal system memory mode.

It should also be noted that in order to improve the overall performance of the memory system, the conventional computer systems may interleave the addresses of different memory modules (such as DIMM strips) during the addressing of memory address, to form an interleaved address mapping table. In this way, when the host controller performs data write and read operations, data can be distributed among different memory modules. That is, the data of each memory module is incomplete. When performing the intensive computing method 400 illustrated in FIG. 4, each module that performs the intensive computation needs to obtain the complete data, so the memory modules participating in the intensive computation cannot be added into the interleaved address mapping table. To this end, in some embodiments of the present disclosure, the address interleaving of these memory modules can be released by modifying the BIOS. For example, for a process during which the memory address decoder resolves the system addresses to the memory addresses, three steps may be involved: 1)

decoding from the system addresses to the channel addresses (System→Channel); 2) decoding from the channel addresses to the memory array addresses (Channel-→Group); 3) decoding from the memory array addresses to the memory addresses (Group→DRAM). In some embodiments, the first two steps of the above-described resolving process can be modified by modifying the BIOS, thereby releasing the address interleaving of the memory module participating in the intensive computation.

Figure 5:
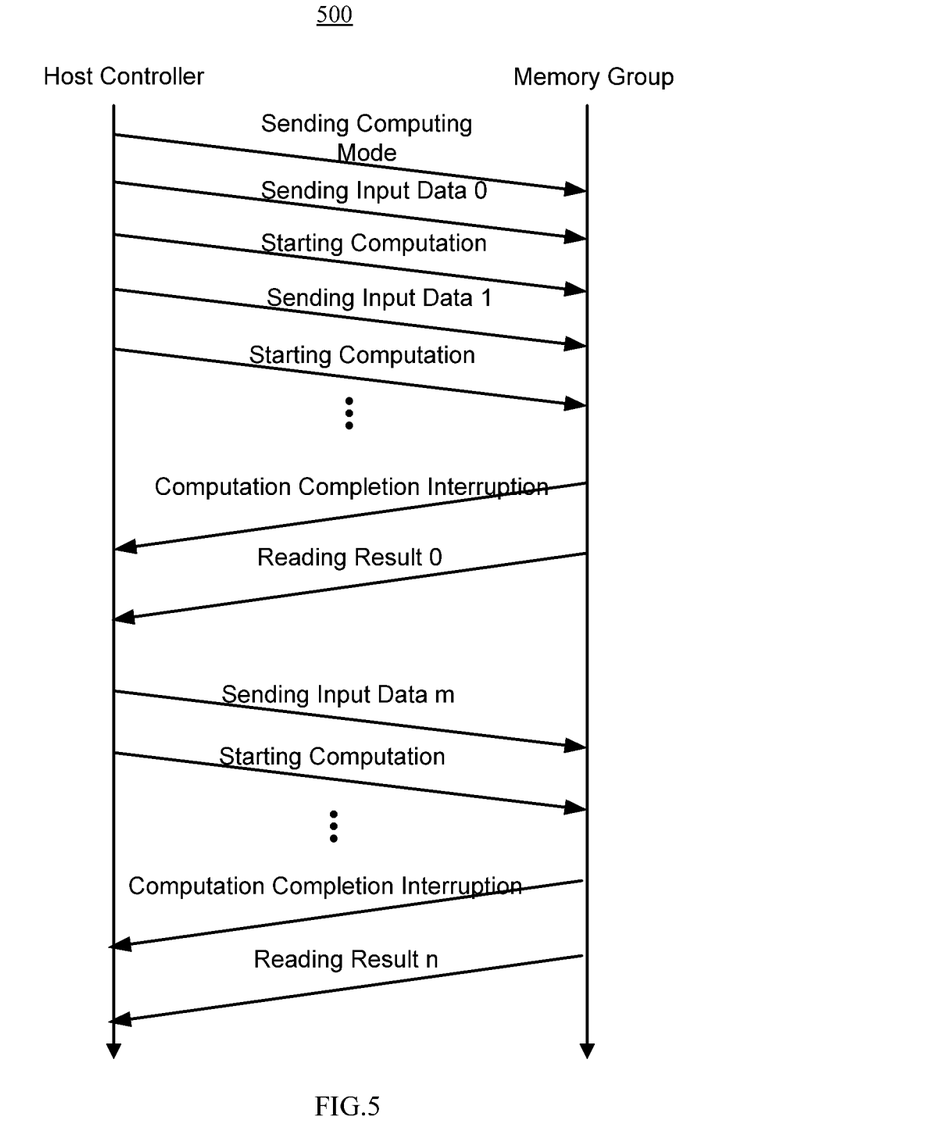
FIG. 5 illustrates a flow chart of an intensive computing method according to another embodiment of the present application.

FIG. 5 illustrates a flow chart of an intensive computing method 500 according to another embodiment of the present application. Different from the method 400 shown in FIG. 4 which processes data 0 to data n in a batch, in the method 500, data 0 to data n are sequentially processed. Specifically, the host controller sends an instruction of the computing mode to the memory system, and sends data 0 to the memory system and then immediately sends a command of starting computation to instruct the memory system to start computing on data 0. Similarly, the host controller sends data 1 and then sends a command of starting computation for data 1. The process repeats until data n and corresponding command of starting computation for data n are sent to the memory system. In addition, in the method 500, instead of reading the result after completing the computation of data 0 to data n, the memory system may send a computation completion interruption to the host controller after completing the computation of any data to notify the host controller to read the computation result. As shown in FIG. 5, before the host controller sends input data m to the memory system, the memory system sends a computation completion interruption corresponding to data 0 to the host controller, and the host controller reads the computation result of data 0 from the memory system accordingly. Since data is provided in a more fragmented way, the computation flow shown in FIG. 5 has a faster response speed than the computation flow shown in FIG. 4.

Figure 6:
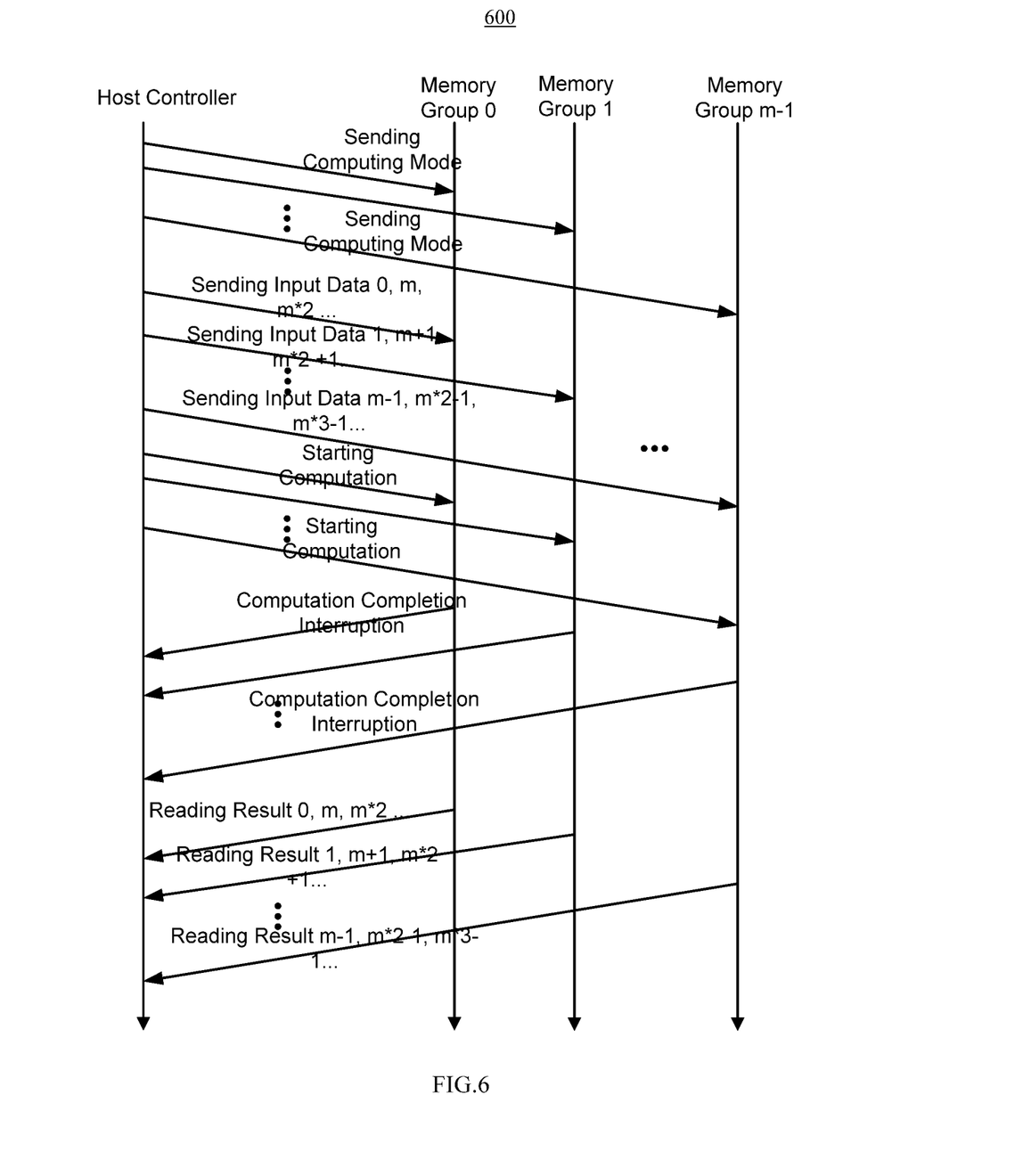
FIG. 6 illustrates a flow chart of an intensive computing method according to another embodiment of the present application.

FIG. 6 illustrates a flow chart of an intensive computing method 600 according to another embodiment of the present disclosure. Unlike the method 400 shown in FIG. 4 which comprises only one memory group, the method 600 shows intensive computing by a plurality of memory groups. The host controller may send input data and computing instructions to the plurality of memory groups and read the computation result so that the computing power of the entire intensive computing system can be multiplied. It should be noted that the method 600 adopts a batch processing mode similar to the method 400, that is, simultaneously sending data 0, m, m*2 . . . to the memory group 0; simultaneously sending data 1, m+1, m*2+1 . . . to the memory group 1; . . . ; simultaneously sending data m−1, m*2−1 m*3−1 . . . to the memory group m−1. That is, the data to be computed is approximately evenly distributed between m memory groups, and then the computations are performed in a parallel way. While in other embodiments, one or more of the memory groups 0 to m−1 may further utilize a sequential processing mode similar to the method 500 shown in FIG. 5 to process their respective data sequentially.

The memory system and the memory controller of the present disclosure are described above with reference to FIGS. 1 to 3, and the method for performing intensive computation using the memory system, i.e., the memory controller, is described with reference to FIGS. 4 to 6. However, it should be noted that the memory system of the present disclosure also has other implementations.

Figure 7:
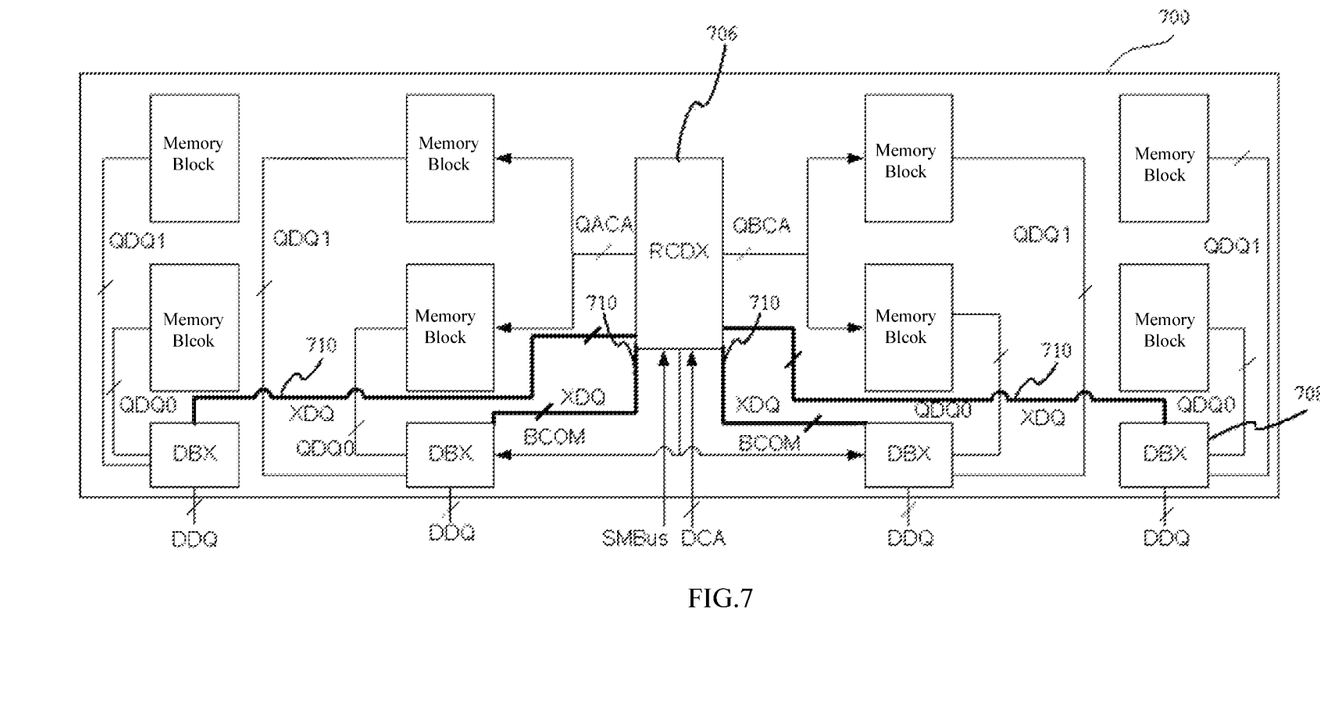
FIG. 7 illustrates a memory system according to another embodiment of the present application.
Figure 8:
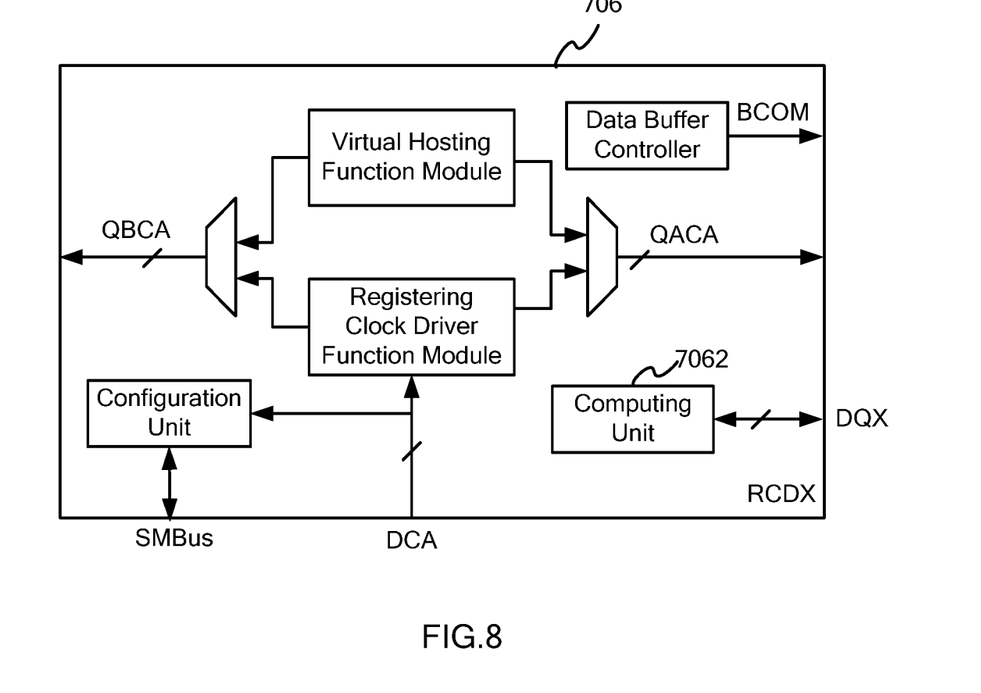
FIG. 8 illustrates an exemplary structure of the registering clock driver in the memory system of FIG. 7.

FIG. 7 illustrates a memory system 700 according to another embodiment of the present application. In the memory system 100 of FIG. 1, the computing unit is integrated in the data buffers and the registering clock driver is responsible for scheduling control, while in the memory system 700 of FIG. 7, high-speed interfaces 710 (XDQ) are added between the registered clock driver 706 and the respective data buffers 708, and the registering clock driver 706 also comprises a computing unit 7062 (also shown in FIG. 8). The computing unit 7062 is coupled to the multiplexing unit of each data buffer 708 through the high-speed interface XDQ. When the registering clock driver is operating in the second mode (i.e. the intensive computing mode), the logic control unit in the data buffer 708 also controls the multiplexing unit to exchange data between the memory block and the computing unit 7062 in the registering clock driver 706. Thus, in addition to the computing unit in each data buffer 708, the computing unit 7062 in the registering clock driver 706 can also undertake some computing tasks. For example, the computing unit 7062 in the registering clock driver 706 can undertake the computations related to the global tasks of the memory system 700.

Figure 9:
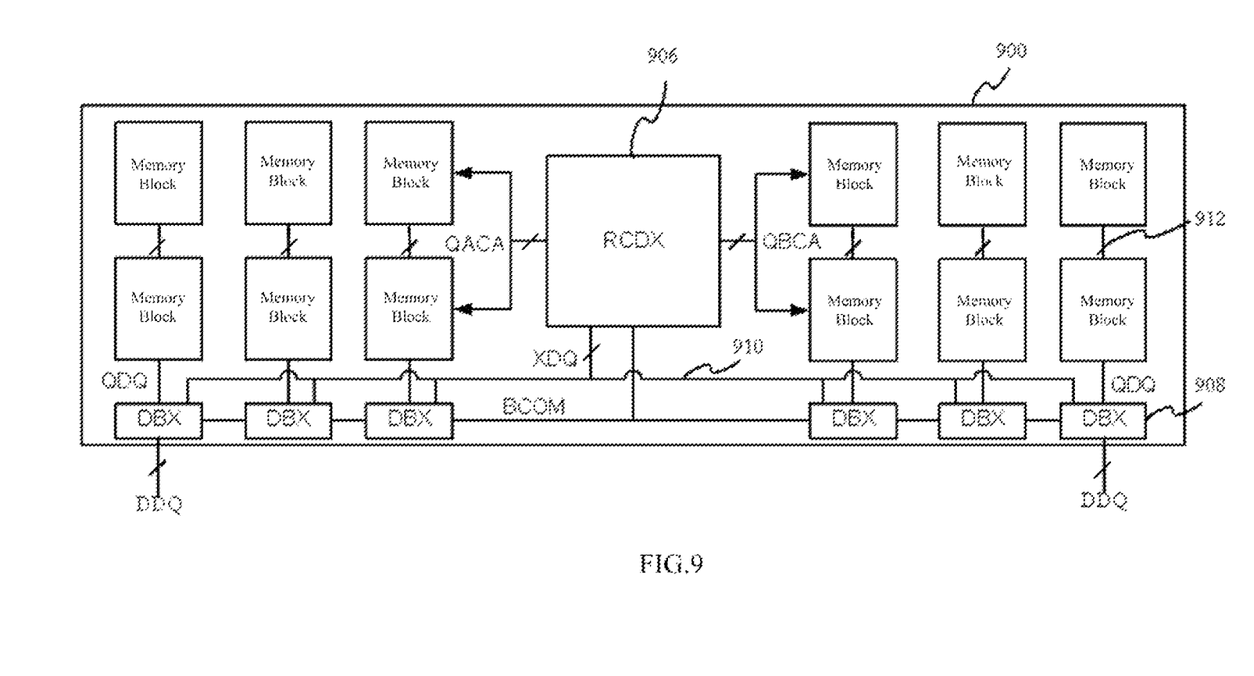
FIG. 9 illustrates a memory system according to another embodiment of the present application.

FIG. 9 illustrates a memory system 900 according to another embodiment of the present application. Compared with the memory system 100 of FIG. 1, the data buffer 908 of the memory system 900 comprises a logic control unit and a multiplexing unit but does not comprise a computing unit. The computing unit is provided in the registering clock driver 906 and is coupled to the multiplexing units in each data buffer 908. When the operation command indicates that the registering clock driver 906 is operating in the intensive computing mode, the logic control unit in the data buffer 908 controls the multiplexing unit to exchange data between the memory block and the computing unit in the registering clock driver 906. That is, all the computing tasks are undertaken by the computing unit in the registering clock driver 906, and all data needs to be exchanged between the registering clock driver and the memory block via the data bus 910 (XDQ) coupled between the data buffers and the registering clock driver. It should be noted that in the memory system 900 in FIG. 9, as an example, each data buffer 908 is coupled to a plurality of memory blocks through one data bus 912. While in other examples, similar to the memory system 100 of FIG. 1, each data buffer 908 may be coupled to a plurality of memory blocks via a plurality of data buses 912 in a one-on-one manner, or in a one-to-many manner similarly.

Figure 10:
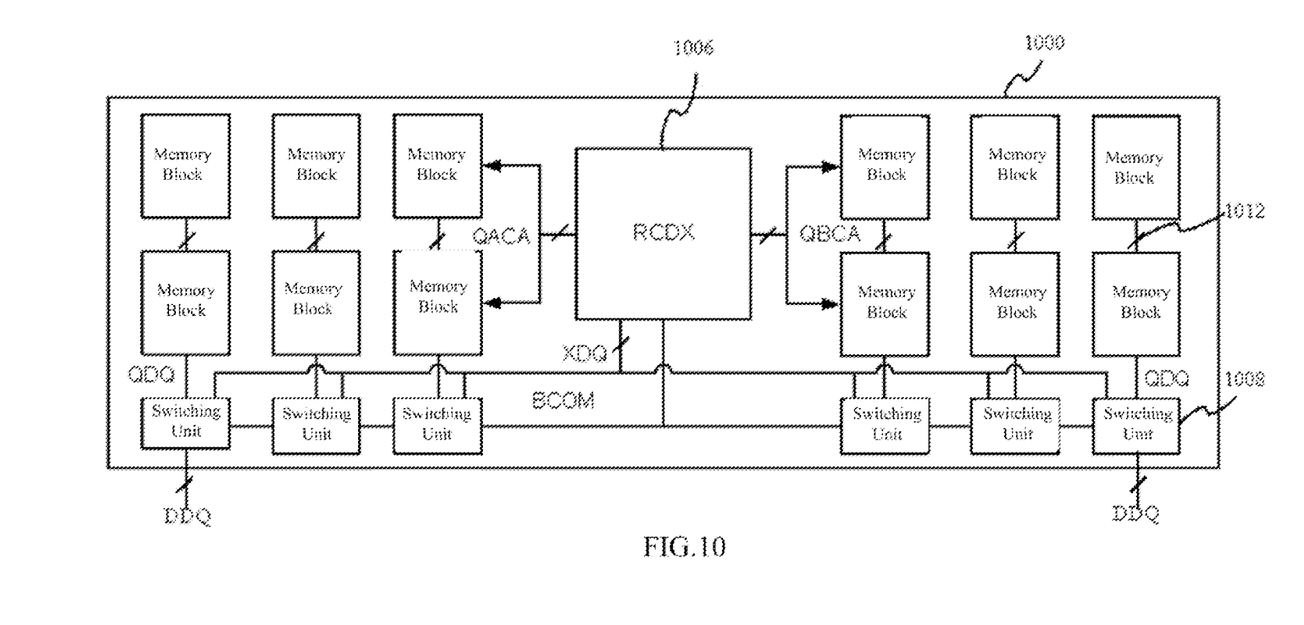
FIG. 10 illustrates a memory system according to another embodiment of the present application.

FIG. 10 illustrates a memory system 1000 according to another embodiment of the present application. Similar to the memory system 900 of FIG. 9, the computing unit is provided in the registering clock driver 1006. However, the memory system 1000 does not comprise a data buffer but comprises a switching module 1008 instead, which is coupled to the registering clock driver 1006 and between the host controller and the memory module for receiving a switching control signal from the host controller (not shown in figures) or the registering clock driver 1006. The switching module 1008 is used for switching to either one of the registering clock driver 1006 and the host controller in response to the switching control signal to exchange data with the memory module. Each switching module is coupled to the memory group and the registering clock driver via respective data buses. In some embodiments, the switching module may be a multiplexer, for example.

When the registering clock driver 1006 is operating in the intensive computing mode, the computing unit in the registering clock driver 1006 performs computation on the data received from the memory module, and returns the computing result to the memory module through the switching module. It should be noted that in the memory system 1000 in FIG. 10, as an example, each switching module 1008 is coupled to a plurality of memory blocks via a data bus 1012 (QDQ). While in other examples, similar to the memory system 100 of FIG. 1, each switching module 1008 may be coupled to a plurality of memory blocks via a plurality of data buses 1012 in a one-on-one manner, or in a one-to-many manner similarly.

The methods utilizing the memory system in FIGS. 7, 9 and 10 to perform intensive computation may be referred to FIGS. 4-6, with only a difference that the configurations of the computing blocks and the data buses in different memory systems are different, so it will not be repeated in detail herein.

It can be understood that the memory system of the embodiments of the present application may be applied to the memory, and the memory system may also be used in different computer systems.

It should be noted that although several modules or sub-modules used in memory controller and several steps of an intensive computation method have been described in the previous paragraphs, such division is exemplary and not mandatory. Practically, according to the embodiments of the present disclosure, the functions and features of two or more modules described above may be embodied in one module. On the other hand, the functions and features of any one module described above may be embodied in two or more modules.

Those skilled in the art may understand and implement other variations to the disclosed embodiments from a study of the drawings, the disclosure, and the appended claims. In the claims, the word "comprising" does not exclude other elements or steps, and the indefinite article "a" or "an" does not exclude a plurality. In applications according to present disclosure, one element may conduct functions of several technical feature recited in claims. Any reference signs in the claims should not be construed as limiting the scope. The scope and spirit of the present application are defined by the appended claims.

What is claimed is:

1. A memory controller coupled to a memory module for controlling access to the memory module, wherein the memory module comprises one or more memory groups each having a plurality of memory blocks, the memory controller comprising:
    a registering clock driver coupled to the memory module for providing to the memory module a data access command so as to control access to the memory module; and
    one or more data buffers coupled to the registering clock driver, and each data buffer coupled to a memory group via a memory group data interface, wherein at least one of the memory group data interfaces comprises a plurality of data buses each coupled to one or more memory blocks of the memory group that the memory group data interface is coupled to, such that the memory group can exchange data with the data buffer via the plurality of data buses under the control of the registering clock driver;
    wherein the registering clock driver comprises a configuration unit, and the registering clock driver and the data buffer operate in a first mode or a second mode based on a state of the configuration unit, wherein:
    in the first mode, the registering clock driver receives the data access command from a host controller and is responsive to the data access command to allow access to the memory module by the host controller via the data buffer; and
    in the second mode, the registering clock driver generates the data access command to instruct the data buffer to access the memory module according to the data access command.

2. The memory controller of claim 1, wherein the registering clock driver is configured to receive state control information from the host controller via a command/address bus and to configure the state of the configuration unit according to the state control information.

3. The memory controller of claim 1, wherein the registering clock driver is coupled to the host controller via a SMBus interface, and the host controller is configured to change or read the state of the configuration unit in the registering clock driver via the SMBus interface.

4. The memory controller of claim 1, wherein the data buffer is coupled to the registering clock driver and is configured to receive an operation command from the registering clock driver, and the operation command is for instructing the data buffer to operate in the first mode or in the second mode.

5. The memory controller of claim 4, wherein the data buffer comprises a logic control unit, a multiplexing unit and a first computing unit, and wherein
    the logic control unit is configured to receive the operation command from the registering clock driver, wherein
    the logic control unit is configured to control the multiplexing unit to exchange data between the one or more memory blocks and the host controller when the operation command indicates that the registering clock driver and the data buffer are operating in the first mode; and
    the logic control unit is configured to control the multiplexing unit to exchange data between the one or more memory blocks and the first computing unit when the operation command indicates that the registering clock driver and the data buffer are operating in the second mode.

6. The memory controller of claim 4, wherein the data buffer comprises a logic control unit and a multiplexing unit, and the registering clock driver comprises a computing unit coupled to the multiplexing units of each data buffer, wherein
    the logic control unit is configured to receive the operation command from the registering clock driver, and wherein
    the logic control unit is configured to control the multiplexing unit to exchange data between the one or more memory blocks and the host controller when the operation command indicates that the registering clock driver and the data buffer are operating in the first mode; and
    the logic control unit is configured to control the multiplexing unit to exchange data between the one or more memory blocks and the computing unit when the operation command indicates that the registering clock driver and the data buffer are operating in the second mode.

7. The memory controller of claim 5, wherein the registering clock driver comprises a second computing unit coupled to the multiplexing units of each data buffer, and
    the logic control unit is further configured to control the multiplexing unit to exchange data between the one or more memory blocks and the second computing unit when the operation command indicates that the registering clock driver and the data buffer are operating in the second mode.

8. A memory system comprising a memory module and a memory controller coupled to the memory module for controlling access to the memory module, wherein the memory module comprises one or more memory groups each having a plurality of memory blocks, and wherein the memory controller comprises:
- a registering clock driver coupled to the memory module for providing to the memory module a data access command so as to control access to the memory module; and
- one or more data buffers coupled to the registering clock driver, and each data buffer coupled to a memory group via a memory group data interface, wherein at least one of the memory group data interfaces comprises a plurality of data buses each coupled to one or more memory blocks of the memory group that the memory group data interface is coupled to, such that the memory group can exchange data with the data buffer via the plurality of data buses under the control of the registering clock driver;

wherein the registering clock driver comprises a configuration unit, and the registering clock driver and the data buffer operate in a first mode or a second mode based on a state of the configuration unit, wherein:

in the first mode, the registering clock driver receives the data access command from a host controller and is responsive to the data access command to allow access to the memory module by the host controller via the data buffer; and in the second mode, the registering clock driver generates the data access command to instruct the data buffer to access the memory module according to the data access command.

9. A computer system comprising the memory system of claim 8.

* * * * *